United States Patent [19]
Reichow et al.

[11] Patent Number: 5,272,297
[45] Date of Patent: Dec. 21, 1993

[54] STREAMLINED AIR CONDITIONING DISCONNECT SWITCH

[75] Inventors: Matt Reichow, St. Paul; Randall M. Olson, Plymouth, both of Minn.

[73] Assignee: General Electric Company, New York, N.Y.

[21] Appl. No.: 979,922

[22] Filed: Nov. 23, 1992

[51] Int. Cl.⁵ .................. H01H 15/06; H02B 1/08
[52] U.S. Cl. .................. 200/549; 200/548; 200/573; 200/293; 361/641; 361/823; 361/835; 361/600
[58] Field of Search .............. 200/50 A, 293, 329, 200/547-550, 573; 361/346-361, 376, 426, 432

[56] References Cited

U.S. PATENT DOCUMENTS

| 4,675,782 | 6/1987 | Hibbert et al. | 361/356 |
| 4,851,963 | 7/1989 | Miller et al. | 361/356 |

FOREIGN PATENT DOCUMENTS

| 1196274 | 7/1965 | Fed. Rep. of Germany | 200/548 |
| 0851520 | 7/1981 | U.S.S.R. | 200/329 |

Primary Examiner—Gregory D. Thompson
Attorney, Agent, or Firm—Richard A. Menelly

[57] ABSTRACT

An air conditioning disconnect switch utilizes a ramped movable contact arrangement for slidably opening and closing the switch contacts without the requirement of a removable type pull-out handle. A plastic face plate covering the switch terminals allows the use of a metallic case of reduced depth. The slidable contact arrangement eliminates the bumped cover projection otherwise required with the pull-out handle.

12 Claims, 4 Drawing Sheets

STREAMLINED AIR CONDITIONING DISCONNECT SWITCH

BACKGROUND OF THE INVENTION

U.S. Pat. No. 4,675,782 entitled "Molded Plastic Enclosure for Disconnect Switches" describes a switch contained within a plastic enclosure wherein the plastic multi-functionally provides support and electrical insulation to the electrical fuses and other electrical components contained therein. For some non-fused applications, a less expensive disconnect switch contained within a metal enclosure can be employed.

U.S. Pat. No. 4,851,963 entitled "Weatherproof Air Conditioning Disconnect Switch" describes a simple switch enclosed within a metal enclosure that includes a pull-out handle that carries the movable contacts in and out of connection with the fixed contacts arranged within the switch housing. To prevent inadvertent replacement of the handle when the air conditioning equipment is being installed or repaired, the operator may retain the handle until such repair or installation is completed. The loss or misplacement of the handle could cause needless delay in obtaining a replacement before the equipment could become operational.

The use of residential type circuit breakers within the enclosure in place of the pull-out handle insures that the equipment can be turned on and off without removing and perhaps misplacing the operating handle. Such circuit breakers operate efficiently to both protect and control the associated equipment but add to the overall cost.

One purpose of the invention is to provide an electric disconnect switch of reduced dimensions that operate within a metal enclosure without the requirement of circuit breakers to turn the associated electric equipment on and off.

SUMMARY OF THE INVENTION

An electric disconnect switch for air conditioners and other electrical equipment that are turned on and off from a remote location includes a plastic switch assembly contained within a metal enclosure. A ramped movable contact arrangement slidably moves the switch contacts between their on and off conditions. A plastic face plate ensures proper over-surface electrical clearance while containing information and caution indicia integrally-formed therein.

DESCRIPTION OF THE PREFERRED EMBODIMENT

Figure 1:
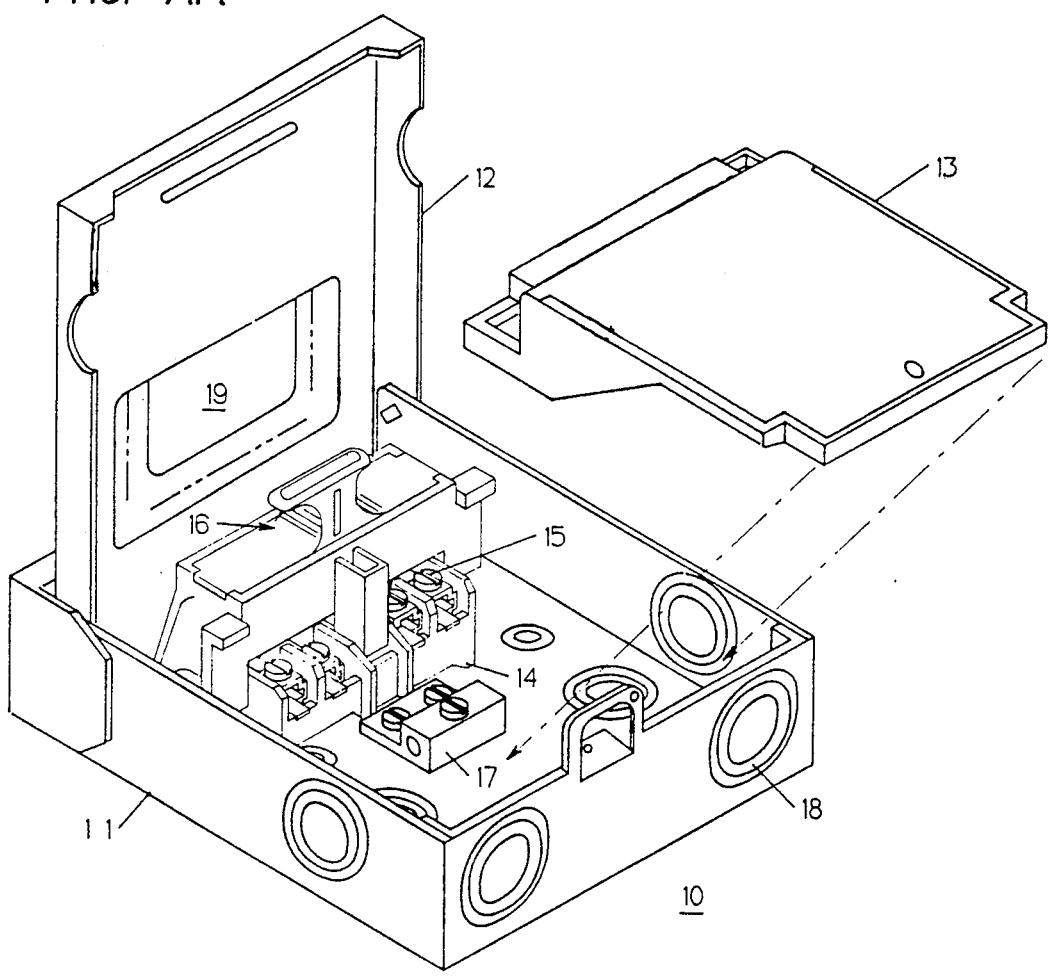
FIG. 1 is a top perspective view of an air conditioning disconnect switch according to the prior art with the face plate removed to detail the operating components.

An air conditioning disconnect switch 10 similar to that described within aforementioned U.S. Pat. No. 4,851,963 is depicted in FIG. 1. The switch includes a metal case 11 to which a metal cover 12 is hinged. A plastic face plate 13 which includes indicia formed therein is positioned over the terminal block 14 to prevent inadvertent contact with the terminal lugs 15 carried on the block and the ground terminal connector 17 attached directly to the case. Electrical access with the interior of the switch is made by means of knockouts 18 formed in the sides of the case and clearance for the handle operator 16 is provided by means of the depression 19 formed on the inside surface of the cover 12. As described in the aforementioned U.S. Pat. No. 4,851,963, the switch is turned on and off by removal of the handle operator from the terminal block to correspondingly make and break connection between the terminal lugs 15.

Figure 2:
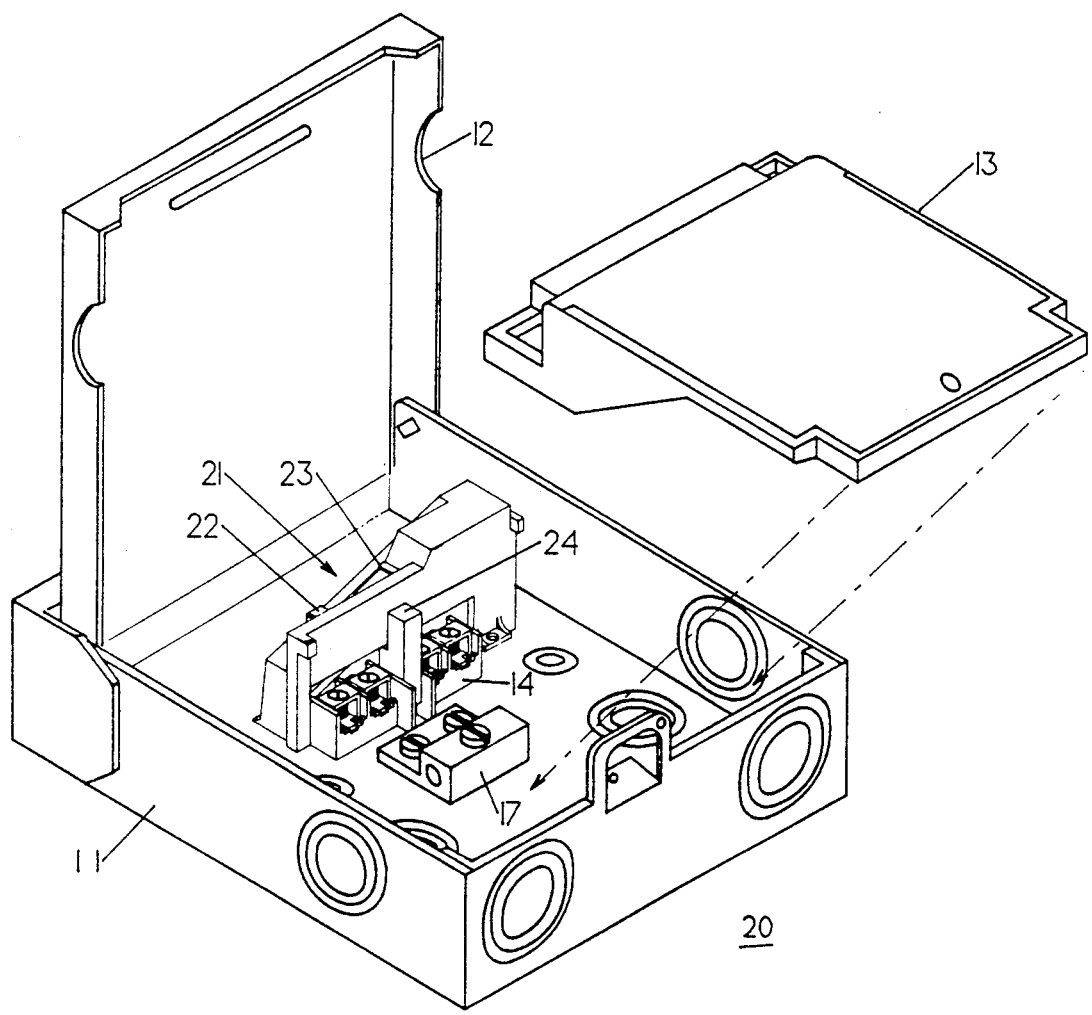
FIG. 2 is a similar top perspective view of an air conditioning switch according to the invention.

To facilitate inventory requirements as well as to minimize cost, the novel disconnect switch 20 depicted in FIG. 2 has common components with the switch 10 shown earlier and common reference numerals will be used where possible. The switch 20, for example, comprises a metal case 11 to which a similar metal cover 12 is hinged and a plastic face plate 13 is used to protect the terminal block 14 and ground connector 17. The terminal block 14 captures the locking block 24 integrally-formed on a side of the switch operator assembly 21 in a manner to be described below in greater detail. The switch operator includes a handle post 22 extending up through a rectangular handle access slot 23 which allows an operator to turn the switch on and off in the manner to be described below.

Figure 3:
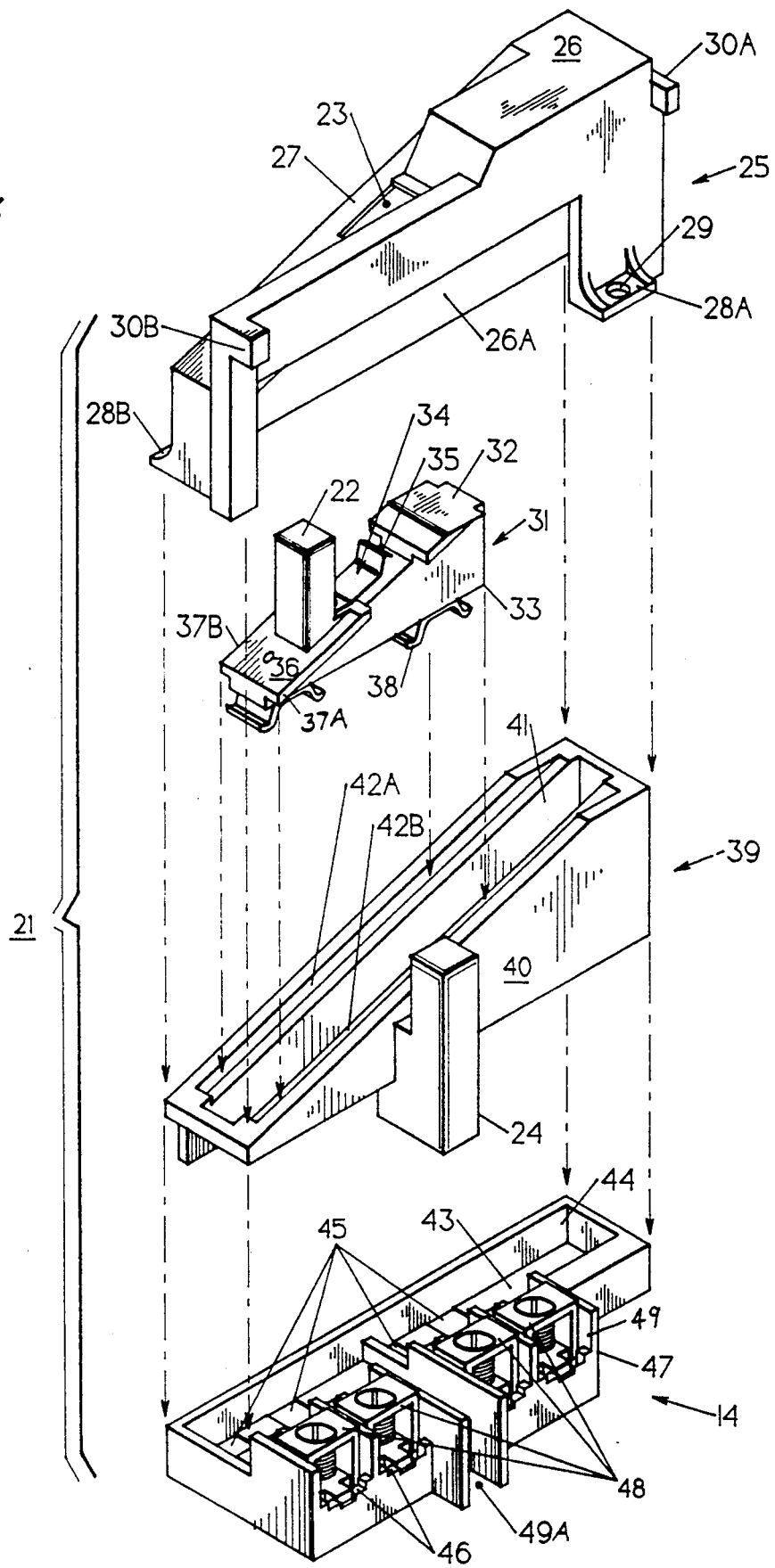
FIG. 3 is a top perspective view of the operating components within the switch of FIG. 2 prior to assembly.

As best seen by referring now to FIG. 3, the switch operator assembly 21 includes a support housing 25 formed from a molded plastic composition which includes a planar top 26 and a central ramp 27 depending down from the top at a predetermined acute angle. A rectangular side piece 26A coextends along the ramp and includes a support tab 30B which cooperates with a similar support tab 30A extending from the top to support the front plate 13 shown earlier in FIGS. 1 and 2. A pair of opposing fastening tabs 28A, 28B extending from the bottom of the support housing and include thru-holes 29 to facilitate attachment of the support housing to the case. The handle post slot 23 is formed within the ramp and captures the handle post 22 integrally-formed within the handle operator 31. The handle operator is a separate element also formed from a molded plastic material and includes a planar top 32 which sits under the top 26 of the support housing and a ramped apron 36 which depends downward from the top 32 at the same predetermined angle described earlier.

The handle operator 31 consists of a molded plastic triangular body 33 to which a pair of U-shaped contact blades 38 which comprise the movable switching contacts are attached. A planar contact spring 34 is attached to a top part of the apron and includes an angulated end 35 that interfaces with the inner surface of the central ramp in a manner to be described below. A pair of runners 37A, 37B extend from opposite sides of the apron 36 and overlay the tracks 42A, 42B formed on opposite sides of the ramped elongated rectangular handle support slot 41 defined within the molded plastic triangular body 40 of the handle operator guide 39. The locking block 24 is integrally-formed with the body 40 and extends from a side of the body for press-fit capture within the central terminal recess 49A formed within the terminal support 46 on one side of the terminal block 14. The remaining terminal recesses 49 outboard the central recess contain the terminal lugs 48 each of which is connected with a corresponding planar busbar contact 45 which comprise the stationary contacts. The busbar contacts are positioned within the bottom of the rectangular cavity 43 surrounded by the upstanding perimetric wall 44. The upstanding barriers 47 integrally-formed within the terminal block define the terminal recesses 49 formed within the terminal support 46 and provide the requisite electrical isolation to the terminal lugs contained therein.

Figure 4:
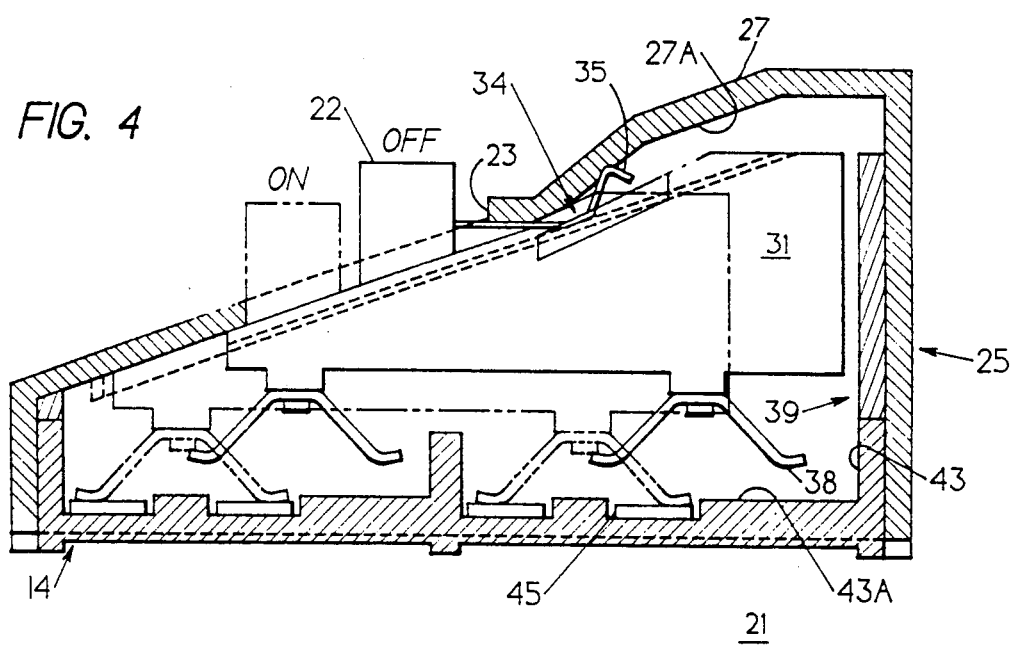
FIG. 4 is a side sectional view of the switch of FIG. 2.

The operation of the switch 21 between the "ON" and "OFF" conditions depicted in phantom and in solid lines respectively in FIG. 4 is as follows. In the OFF position, the handle post 22 on the handle operator 31 is at the uppermost edge of the rectangular handle access slot 23 and the angulated end 35 of the contact spring 34 is in an extended relaxed condition under the inner surface 27A of the central ramp 27 of the support housing 25. The U-shaped contact blades 38 are above and out of contact with the busbar contacts 45 that are recessed within the bottom 43A of the rectangular cavity 43 defined within the terminal block 14. Sliding the handle post downward within the access slot 23 to the opposite edge, compresses the angulated end 35 of the contact spring 34 against the inner surface 27A of the central ramp 27 and forces the U-shaped contact blades in bridging contact with adjacent pairs of the busbar contacts 45 thereby turning the switch to its ON condition. Moving the handle post upwardly within the access slot to the opposite edge lifts the U-shaped contact blades away from and out of electric contact with the busbar contacts to return the switch to its OFF position.

A slidably-operated disconnect switch has herein been described utilizing a ramped support housing, ramped handle operator and ramped handle guide to provide a streamlined configuration within a switch enclosure of reduced overall dimensions.

Having thus described our invention, what we claim by Letters Patent is:

1. An electric disconnect switch comprising:
   a rectangular case;
   a cover hinged to said case;
   a plastic terminal block within said case, said terminal block including a plurality of busbar contacts connecting with a plurality of terminal lugs arranged on a terminal support;
   a handle operator having a plurality of contact blades extending from a bottom surface slidably arranged on said terminal block and a handle post extending upwards from a top surface, said contact blades moving in and out of contact with said busbar contacts in response to manual movement of said handle post between ON and OFF positions;
   a plastic face plate arranged over said terminal support to electrically isolate said terminal lugs; and
   a plastic support housing arranged over said handle operator, said support housing comprising a planar top and a central ramp extending from said top at a predetermined acute angle, said central ramp including a rectangular handle access slot, said handle post extending within said handle access slot, said handle operator including a contact spring extending from a top surface, said contact spring interacting with a bottom surface of said support housing top to provide contact pressure between said contact blades and said busbar contacts when said handle post is in an ON position.

2. The disconnect switch of claim 1 wherein said handle operator comprises a triangular body.

3. The disconnect switch of claim 1 wherein said support housing includes a rectangular side coextensive with said central ramp, said support housing top and said support housing side each including integral tabs supporting one end of said face plate.

4. The disconnect switch of claim 1 wherein, said contact spring comprises a planar end and an angulated end, said planar end being fastened to said handle operator top surface and said angulated end extending upright from said handle operator top surface.

5. An electric disconnect switch comprising:
   a rectangular case;
   a cover hinged to said case;
   a plastic terminal block within said case, said terminal block including a plurality of busbar contacts connecting with a plurality of terminal luge arranged on a terminal support;
   a handle operator having a plurality of contact blades extending from a bottom surface slidably arranged on said terminal block and a handle post extending upwards from a top surface, said contact blades moving in and out of contact with said busbar contacts in response to manual movement of said handle post between On and OFF positions;
   a plastic face plate arranged over said terminal support to electrically isolate said terminal lugs; and
   a plastic handle operator guide comprising a triangular body having a ramped elongated rectangular handle support slot, said handle post being arranged within said handle support slot.

6. The disconnect switch of claim 5 wherein said handle operator further includes a planar apron supporting said handle post, said apron defining a pair of runners extending from opposite edges and arranged on a corresponding pair of tracks integrally-formed on opposite sides of said handle support slot.

7. The disconnect switch of claim 5 wherein said triangular body further includes a locking block integrally-formed on one side thereof.

8. The disconnect switch of claim 7 wherein said terminal support includes a plurality of terminal compartments, a central one of said compartments receiving said locking block in press-fit relation.

9. The disconnect switch of claim 5 wherein said terminal block further includes an upstanding perimetric wall defining a rectangular cavity, said busbar contacts being recessed within said cavity.

10. The disconnect switch of claim 9 including a plurality of upstanding barriers intermediate said terminal compartments electrically isolating said terminal lugs.

11. The disconnect switch of claim 5 wherein said case is metal.

12. The disconnect switch of claim 5 wherein said cover is metal.

* * * * *